US006758753B1

(12) United States Patent
Nagata et al.

(10) Patent No.: US 6,758,753 B1
(45) Date of Patent: Jul. 6, 2004

(54) INPUT APPARATUS FOR GAME SYSTEMS

(75) Inventors: Kenji Nagata, Tokyo (JP); Kaoru Watanabe, Tokyo (JP); Kouki Atobe, Tokyo (JP); Terukazu Shimada, Tokyo (JP)

(73) Assignee: Konami Co., Ltd., Tokyo (JP)

( * ) Notice: Subject to any disclaimer, the term of this patent is extended or adjusted under 35 U.S.C. 154(b) by 0 days.

(21) Appl. No.: 09/594,389

(22) Filed: Jun. 15, 2000

(30) Foreign Application Priority Data

Jun. 18, 1999 (JP) ........................................ P11-172503

(51) Int. Cl.[7] ........................... A63F 13/00; A63F 9/24; G06F 17/00; G06F 19/00

(52) U.S. Cl. ............................. 463/36; 463/46; 463/47; 273/148 R; 273/148 B

(58) Field of Search .............................. 463/86, 37, 38, 463/1, 2, 6, 7, 33, 46, 47; 273/148 R, 148 B; 452/52, 54, 8, 9, 6, 7

(56) References Cited

U.S. PATENT DOCUMENTS 3,749,810 A 7/1973 Dow
3,922,944 A 12/1975 Kurosaki et al.
4,121,488 A 10/1978 Akiyama
4,491,050 A * 1/1985 Franzmann .............. 84/1.01 X
4,661,664 A * 4/1987 Miller ....................... 200/85 A
4,720,789 A * 1/1988 Hector et al. ........... 364/410 X
4,845,323 A * 7/1989 Beggs ........................ 200/5 A
4,852,443 A * 8/1989 Duncan et al. .......... 84/1.04 X
5,589,654 A * 12/1996 Konwiser et al. ......... 84/600 X
5,695,859 A * 12/1997 Burgess ..................... 200/85 R
5,828,289 A * 10/1998 Burgess ..................... 338/47 X
5,837,952 A * 11/1998 Oshiro et al. ......... 200/86 R X
5,856,644 A * 1/1999 Burgess ................... 200/61.43
5,886,615 A * 3/1999 Burgess .................. 338/114 X
5,962,118 A * 10/1999 Burgess ............... 428/308.4 X
5,986,221 A * 11/1999 Stanley ........................ 177/136
6,110,073 A * 8/2000 Saur et al. .................. 482/8 X
6,114,645 A * 9/2000 Burgess .................. 200/512 X

FOREIGN PATENT DOCUMENTS

GB 2033129 5/1980
JP 58-162864 10/1983
JP 07-262884 10/1995
JP 10-295937 11/1998

* cited by examiner

*Primary Examiner*—Teresa Walbarg
*Assistant Examiner*—Binh-An D. Nguyen
(74) *Attorney, Agent, or Firm*—Jordan and Hamburg LLP

(57) ABSTRACT

There is provided an input apparatus for game systems, which are simplified in construction. The input apparatus has a base (21) having a plurality of panel-attaching sections (26), a plurality of foot panels (50) arranged respectively at a plurality of panel-attaching sections (26), and tape switches (30) not only arranged between a panel supporting surface **(27*a*) formed on each of a plurality of panel-attaching sections (26) and each of the foot panels but also outputting a predetermined detection signal responsively to changes in pushing load onto each foot panel (50). The tape switch (30) has a sensing element (31) and an elastic-material-made coating member (32) covering the sensing element (31) and functioning as a medium transmitting a load applied to each foot panel 50 to the sensing element (31). The coating element (32) supports the foot panel (50) by contacting with each foot panel (50). Ribs (32*a*, 32*b*) are formed on the coating member (32), so that a load is intensively transmitted to a desired position on the sensing element (31)**.

28 Claims, 9 Drawing Sheets

INPUT APPARATUS FOR GAME SYSTEMS

BACKGROUND OF THE INVENTION

The present invention relates to an input apparatus for game systems, which is usable as a foot switch and the like to be incorporated in a dancing game system.

There has been known an input apparatus for game systems shown in FIGS. 10 and 11. This input apparatus 1 is used to detect player's stamping actions, which has a configuration in which an inner frame 3 having a panel sustaining plane 3*a* is disposed on the inner circumference of an outer frame 2 formed into an approximate square. A cable switch 5 is arranged by way of a support plate 4 on the panel sustaining plane 3*a*. A switch bracket 6 is arranged above the cable switch 5 and an acrylic-material-made panel 7 is placed on the upper surface of the switch bracket 6. The cable switch 5 is placed on each side of the panel 7.

The cable switch 5, which has a surface coated with rubber, has inner contacts that connect with each other and outputs a predetermined detection signal, when a load is applied to the coated rubber. The switch bracket 6 has a metal-made bracket body 6*a* attached displasably up and down against the inner frame 3 and a dumper 6*b* made to contact the panel 7. The panel 7 is supported at corner supporting members placed at the four corners (not shown) and supported displaceably up and down in contact with the switch bracket 6. The switch bracket 6 is arranged so that it faces the central portion in the longitudinal direction of the cable switch 5, and the width of the switch bracket is determined to a length corresponding to ⅓ to ½ of the entire length of the cable switch 5. Thus, when a player stamps the panel 7, its load intensively concentrates at the central portion of the cable switch 5 through the switch bracket 6. This enables the cable switch 5 to swell in sensitivity, so that a stamping action can steadily be detected even when the stamping load applied to the panel 7 is relatively light.

However, in the foregoing input apparatus 1, it is required that the rigidity of the switch bracket 6 be enhanced against deformation due to a large amount of load. Thus the switch bracket 6 rises in weight, resulting in that much handling care must be taken in manufacturing and maintenance. Additionally, there is a possibility that malfunctions of the apparatus may occur on account of the deformation or breakage of the switch bracket 6. Moreover, because the cable switch 5 is arranged on each side of the panel 7 one by one, four switch brackets 6 are always needed for each one panel 7, increasing manufacturing costs of the apparatus by an amount that is not necessarily negligible.

SUMMARY OF TEE INVENTION

An object of the present invention is to provide an input apparatus used by a game system, where the configuration of the input apparatus is simplified by omitting switch brackets.

In order to achieve the object, the present invention is configured as follows.

According to the invention, an input apparatus for game systems comprises an operation member; a supporting device for supporting the operation member in a predetermined direction; and a detection unit capable of outputting a predetermined detection signal in response to changes in load in the predetermined direction in relation to the operation member. The detection unit has a sensing element and an elastic-material-made coating member not only coating the sensing element but also functioning as a medium to transmit the load applied to the operation member to the sensing element. The coating member also functions as the supporting member by contacting the operation member.

In this present invention, because the coating member arranged to the detection unit comes into contact with the operation member to support it, it is unnecessary to place, between the detection unit and the operation member, a member that corresponds to a conventional switch bracket. Thus the input apparatus is simplified in construction, handling care for manufacture and maintenance is reduced, the reliability of the apparatus is improved, and manufacturing costs are reduced. The supporting direction of the operation member by the supporting device includes a variety of directions, such as the vertical and horizontal directions. In other words, it is enough that the supporting device is able to receive a load applied in a predetermined direction to the operation member. The coating member may be fixedly in contact with the operation member to have a function of the supporting device. Alternatively, the coating member may have a function of the supporting device by mutually contacting the coating and operation members only when a load exceeding a predetermined value is applied to the operation member. In the latter, there may additionally be provided an auxiliary supporting device to support the operation member displaceably in the predetermined direction under the condition that both the coating and operation members are not in contact.

In another embodiment, the coating member has protrusions for limiting a position to which the load toward the sensing element is transmitted into a certain range.

Accordingly, the protrusions of the coating member can be utilized to intensively transmit a load to a desired position on the detection unit, like a conventional switch bracket, thus increasing sensitivity in detection.

In yet another embodiment, the sensing element of the detection unit includes one pair of band-like electrode plates that contact or separate from each other according to the load, and the coating member includes protrusions for limiting a position to which the load toward the sensing element is transmitted into a certain range positionally shifted from both longitudinal ends of the electrode plates into a central side thereof.

Accordingly, the protrusions of the coating member can be used to intensively transmit the load at a longitudinal central part of the electrode plates, thus providing a sensitive detection.

In still another embodiment, the protrusions are arranged on an outer surface of the coating member.

Hence, a load applied to the operation member when the protrusions of the coating member come into contact with the operation member is intensively transmitted to a certain area on the coating member.

In another embodiment, the protrusion is arranged on an inner surface of the coating member. A load transmitted to the coating member is, therefore, intensively transmitted to a certain area of the sensing element by way of the protrusion.

In another embodiment, there is further provided a stopper for limiting a displacement in relation to the predetermined direction of the operation member into a certain range.

In yet another embodiment, at least an outer surface portion of the operation member is formed into a panel-like shape, the detection unit is disposed to make contact with the outer surface portion of the operation member, and the stopper is located closer to a center of the operation member than that of the detection unit.

In the invention of claim 7, which is based on the input apparatus of claim 5, at least an outer surface portion of the operation member is formed into a panel-like shape, the detection unit is disposed to make contact with the outer surface portion of the operation member, and the stopper is located nearer side to a center of the operation member than that of the detection unit.

Thus, because the stopper is arranged at an inner side to the detection unit, an amount of bend of the operation member at a contacted point with the detection unit can be suppressed to small, thereby steadily preventing an overload to the detection unit, compared to the configuration in which the stopper is arranged at an outer side to the detection unit Moreover, an amount of bend of the central side of the operation member is restricted to small, thus increasing a feeling of rigidity is given to a player who pushes the operation member at central side. Thus, when the operation member is used as a foot panel on which a player stamps, a good feeling of stamping comparable to that on the floor of conventional architectures can be given to the players.

In another embodiment, the stopper is adjoining the detection unit. As a result, the operation member, which comes into contact with the stopper, deflects at the contacted position serving as a support, wherein an amount of deflection of the operation member on the detection unit is limited to a minimum. Accordingly, an overloaded input to the detection unit can be avoided in a steady manner.

In another embodiment, the foregoing object is solved by an input apparatus for game systems comprising an input apparatus for game systems comprising a base having a plurality of panel-attaching sections; a panel-like operation member arranged at each of the plurality of panel-attaching sections; a detection unit located between a panel-supporting surface formed on each of the plurality of pane-attaching sections and the operation member and capable of outputting a predetermined detection signal in response to changes in pushing load applied to the operation member. The detection unit has a sensing element and an elastic-material-made coating member not only coating the sensing element but also functioning as a medium to transmit the load applied to the operation member to the sensing element. The coating member supports the operation member by contacting the operation member.

Thus, since the coating member arranged to the detection unit comes into contact with the operation member to support it, it is unnecessary to place, between the detection unit and the operation member, a member that corresponds to a conventional switch bracket. Thus the input apparatus is simplified in construction, labor work for manufacture and maintenance is relieved, the reliability of the apparatus is improved, and manufacturing costs are reduced. Additionally, in this embodiment, the supporting direction of the operation member by the coating member includes a variety of directions, such as the vertical and horizontal directions. In other words, it is enough that the coating member comes into contact with the operation member and is capable to receive a load applied in a predetermined direction to the operation member. The coating member may be fixedly in contact with the operation member. Alternatively, the coating member may be made to contact the operation member only when a load exceeding a predetermined value is applied to the operation member. In the latter, there may additionally be provided an auxiliary supporting device to support the operation member displaceably in the predetermined direction when both the coating and operation members are not in contact.

The detection unit may comprise a plurality of detection units arranged at each panel-attaching section such that the operation member is supported at a plurality of points around an outer circumference thereof, and a stopper for limiting an amount of pushing operation toward the operation member is arranged at inside of each detection unit.

Thus, if a pushing load applied to the operation member exceeds a given value, the operation member comes into contact with a plurality of stoppers to be sustained between/among them. This also prevents an overload to the operation member.

The operation member may be a foot panel on which a player is able to stamp. Accordingly, there can be provided a foot switch having various advantages; player's stamping actions are detectable, the apparatus is simplified in construction, manufacturing and maintenance are easier, the reliability is higher, and manufacturing costs are reduced.

DESCRIPTION OF THE PREFERRED EMBODIMENTS

Referring to FIGS. 1 to 9A and 9B, an embodiment of the present invention will now described.

Figure 5:
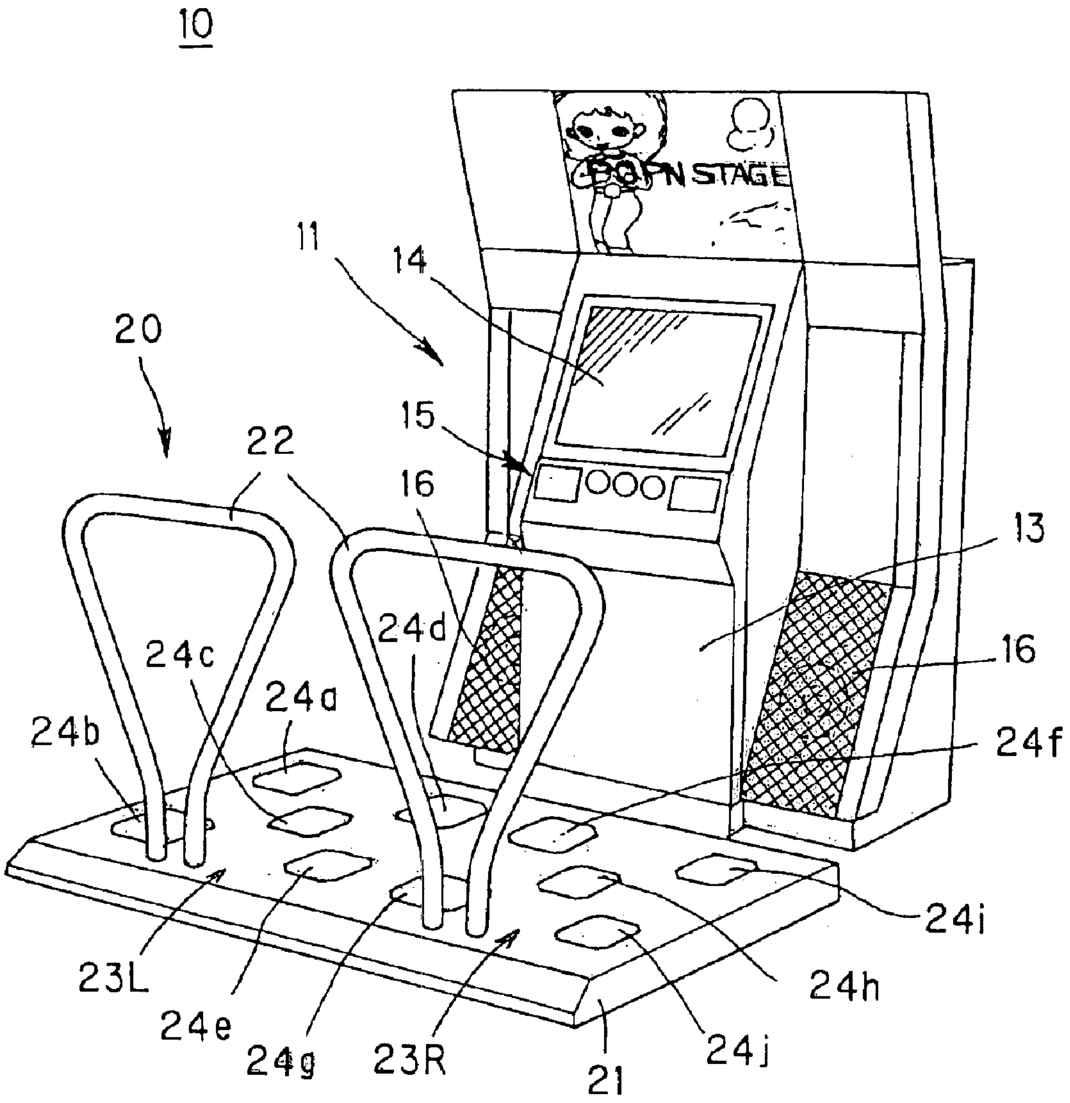
FIG. 5 shows a perspective view of the external appearance of a game system in which the foot switch illustrated in FIG. 1 is used.

FIG. 5 shows the external appearance of an arcade type of game system comprising an input apparatus according to the present invention. The game system 10 has a main unit 11 and a stool unit 20 placed on the floor in front of the main unit 11. The main unit 11 has a housing 13, a monitor 14 arranged at the upper front thereof, a body-side input apparatus arranged under the monitor 14, and speaker units 16,16 arranged at both the sides of the housing 13. The monitor 14 is located such that, when an adult having a standard height stands as a player on the stool unit 20, the monitor almost equals in height the player's eyes. Inside the housing 13, a controller (not shown) is placed, in which such devices as a CPU (central processing unit) and memory units are incorporated in combination to have necessary operations. The controller also controls game images visualized on the monitor 14 and music (including rhythm outputs) reproduced by the speaker units 16 in accordance with the programs of a game.

Figure 6:
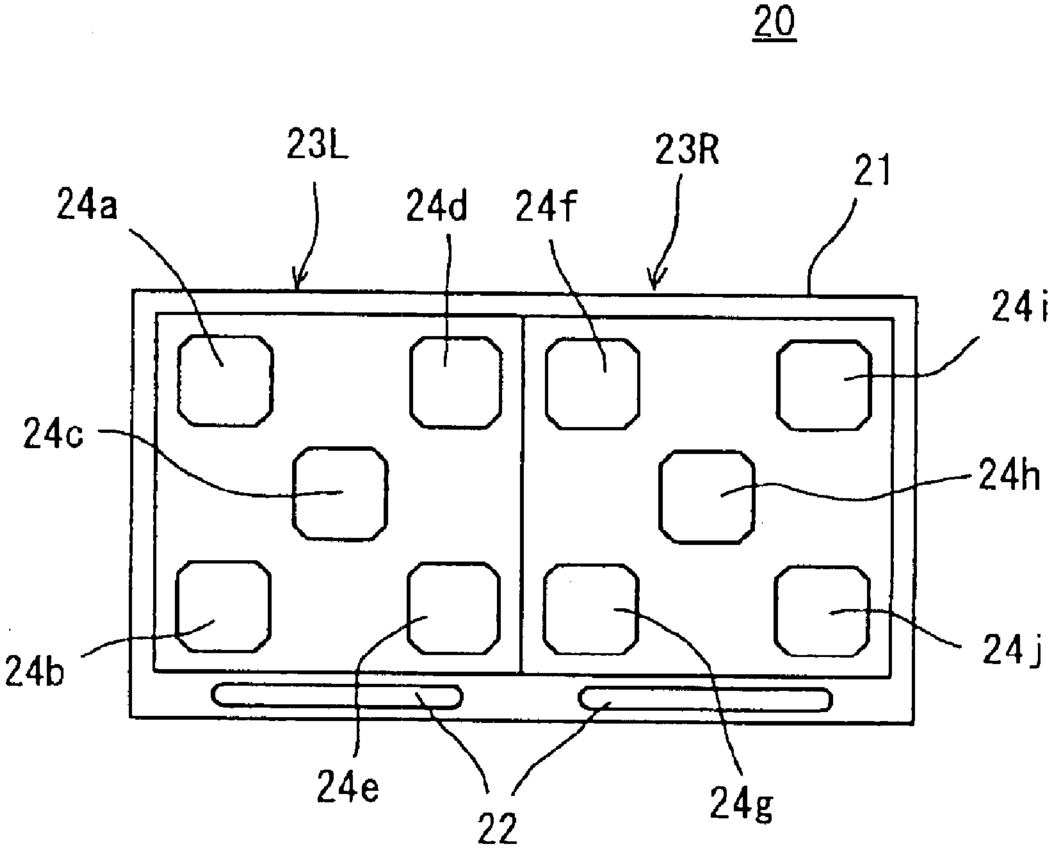
FIG. 6 is a plan view of a stool unit arranged in the game system of FIG. 5.

As shown in FIG. 6, the stool unit 20 is provided with a base 21 and a pair of right and left handrails 22 disposed at the frontal end on the upper surface thereof. On the upper surface of the base 21, a pair of right and left rectangular dancing areas 23L and 23R is defined. In each of the dancing areas 23L and 23R, five foot switches 24*a* to 24*e*,24*f* to 24*j* are disposed. Specifically, one foot switch 24*c*,24*h* is located at the center of each dancing area 23L, 23R, while the remaining four foot switches 24*a*, 24*b*, 24*d*, 24*e* (24*f*, 24*g*, 24*i* and 24*j*) are individually located at the four corners of each dancing area 23L ,23R. This way of disposing these foot switches 24*a* to 24*j* is just one example, and such an arrangement can be changed appropriately in compliance with game contents. Because each foot switch 24*a* (to 24*j*) is constructed in the same way, these foot switches will be representatively denoted as a foot switch 24 in the following explanation, unless they are required to be distinguished from each other.

Figure 1:
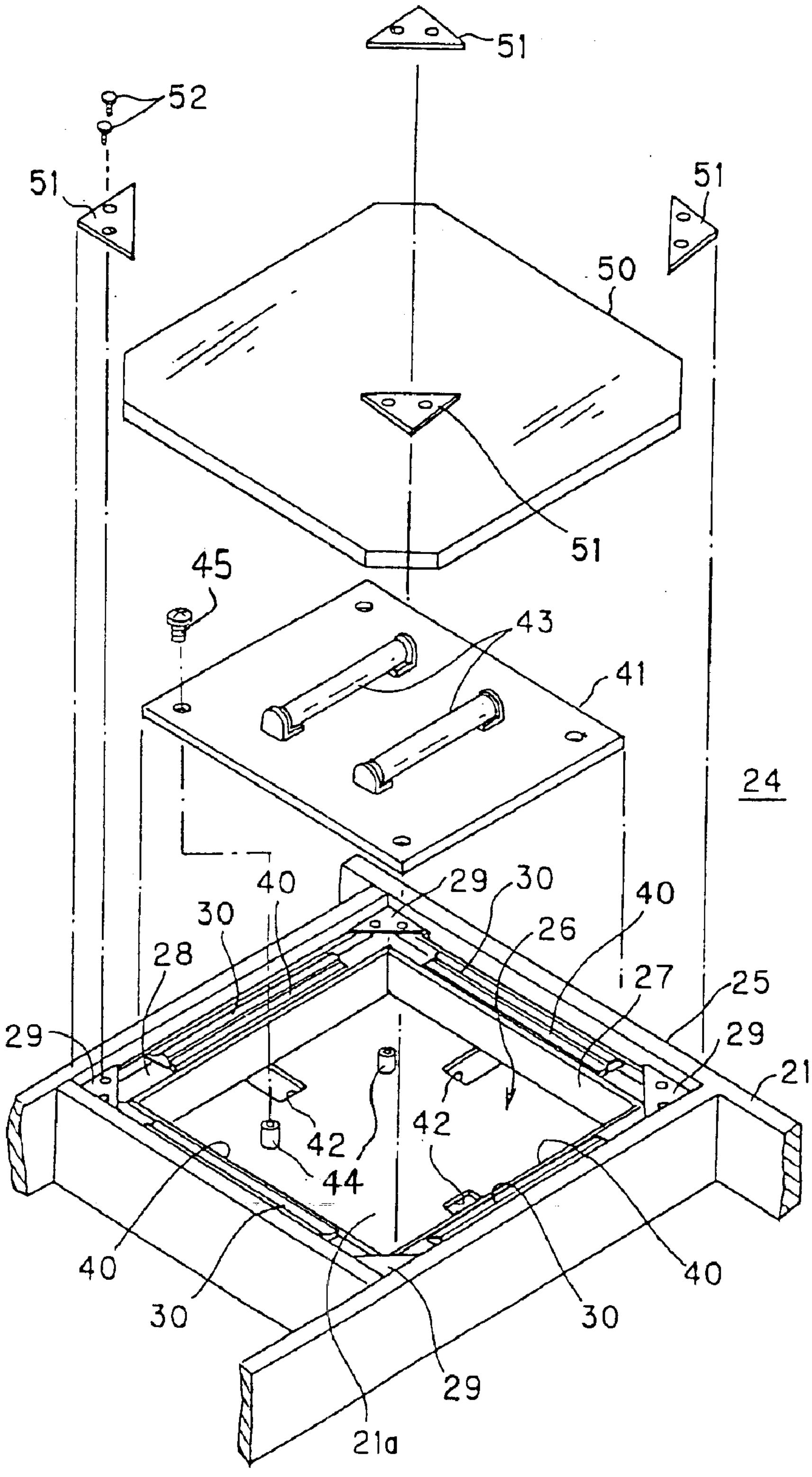
FIG. 1 is a disassembled perspective view of a foot switch to which the present invention is applied.
Figure 2:
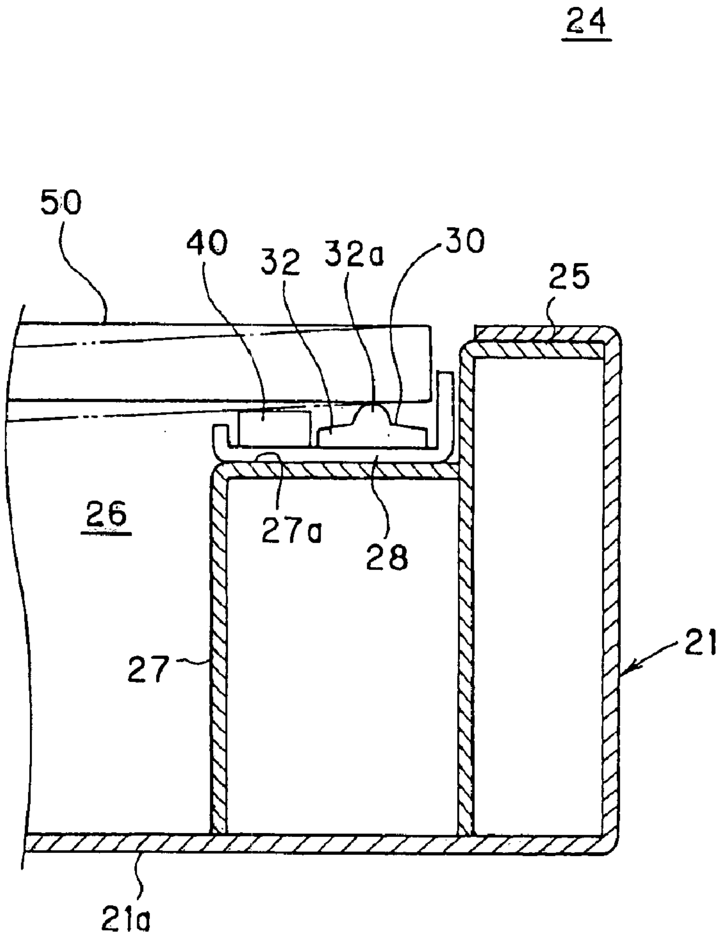
FIG. 2 is a longitudinal sectional view of the foot switch shown in FIG. 1.

FIGS. 1 and 2 show the configuration of a foot switch 24. The foot switch 24 is arranged to detect a player's stamping action. Through the base 21, approximately square panel-attaching sections 26 surrounded by an outer frame 25 are formed, and in the inside of each panel-attaching section 26, an approximate square inner frame 27 is displaced so as to surround the sections 26. The upper surface of the inner frame 27 is formed into a panel-supporting surface 27*a* that is lower in height than that of the outer frame 25. A sustaining plate 28 is attached on the overall panel-supporting surface 27*a*. Both the side edges of the sustaining plate 28 are folded upward. Moreover, at the four corners of the inner frame 27, corner plates 29 are located. The foregoing outer frame 25, inner frame 25, sustaining plate 28 and corner plates 29 are manufactured by sheet metal processing. Both the sustaining plate 28 and the corner plates 29 are integrated through the sheet metal processing. In contrast, the sustaining plate 28 and corner plates 29 may be formed into individual members separated from each other.

A tape switch 30, which functions as a detection unit, is attached on a central part of each side of the inner frame 27 with the sustaining plate 28 inserted therebetween. A stopper 40 is located next to each tape switch 30 at an inside position thereto. A nearly square-shaped foot panel 50 serving as an operation member is disposed so that it covers tape switches 30 and stoppers 40. The foot panel 50 is made from semi-transparent acrylic resin.

Figure 3:
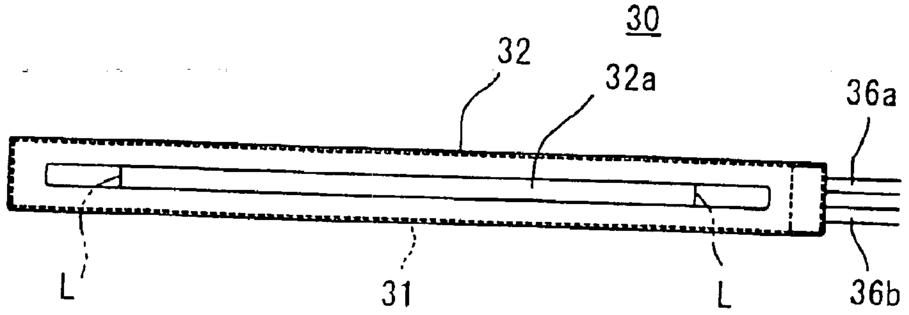
FIG. 3 shows a plan view of a tape switch functioning as a detecting device used in the foot switch illustrated in FIG. 1.
Figure 4A:
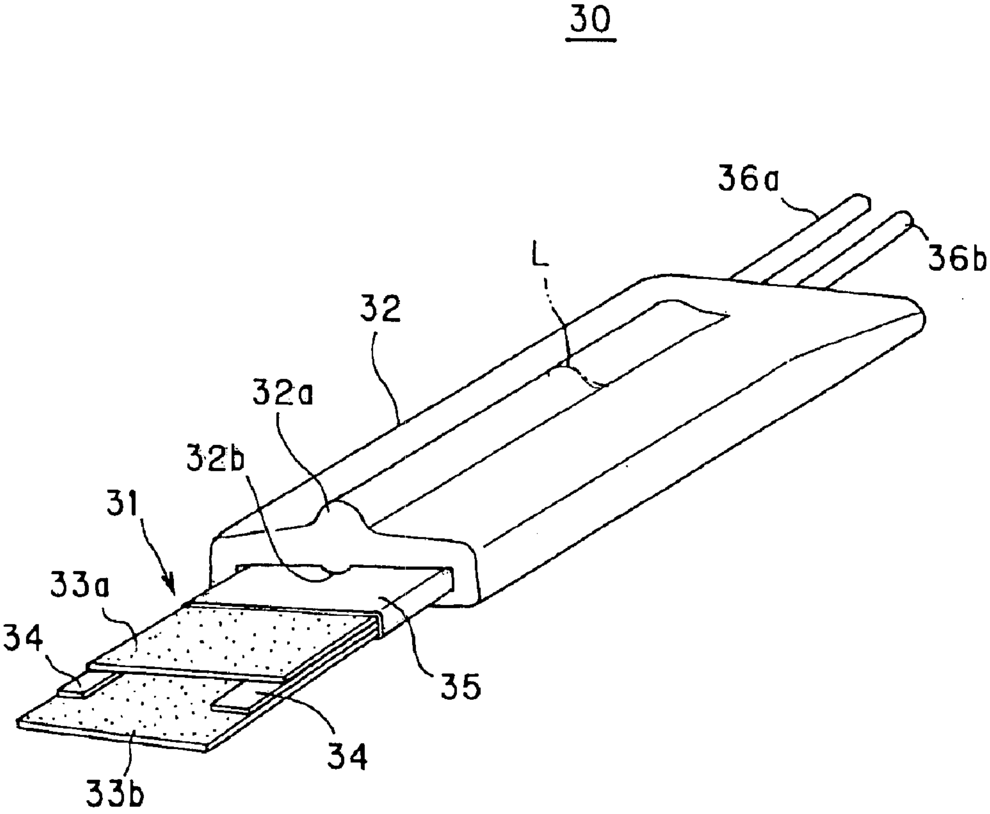
FIGS. 4A to 4C are perspective views, partially in section, showing the tape switch in FIG. 3.

As shown in FIGS. 3 and 4A, the tape switch 30 has a sensing element 31 and a coating member 32 covering the sensing element31. The sensing element 31 has one pair of metallic electrode plates 33*a* and 33*b* mutually facing via one pair of insulating-material-made spacers 34 and 34 disposed at both the side ends of the plates and a protective film 35 enclosing those elements. The protective film 35 is formed by, for example, a heat shrink film. One end of each of the electrode plates 33*a* and 33*b* is connected to each of leads 36*a* and 36*b* to detect electric conduction between the plates. The coating member 32 is formed by elastic materials such as higher elastic rubber. At a central part in the width direction of both the upper surface and the inner surface (which faces the electrode plate 33*a*) of the coating member 32, ribs 32*a* and 32*b* functioning as protrusions are formed, respectively. Accordingly, when a load is applied downward to the rib 32*a*, the load acts on a lateral central part of the electrode plate 33*a* by way of the rib 32*b*, resulting in that the electrode plate 33*a* undergoes a downward deflection with the spacers 34 and 34 using as fulcrums. When this deflection accomplishes a predetermined amount of deformation, the electrode plates 33*a* and 33*b* come into contact with each other, realizing electric conduction between the leads 36*a* and 36*b*. Changing the thickness of the spacers 34 allows the sensitivity of the switch 30 to be adjusted.

The stopper 40 is constructed with elastic materials, such as urethane, of relatively higher values of rigidity. As clearly shown in FIG. 2, the stopper 40 is, to a certain degree, lower in height than the tape switch 30. Thus, in the no-load state under which a player does not exist on the foot panel 50, the outer circumference of the foot panel 50 comes into contact with the rib 32*a* of each tape switch 30, so that the support in the up and down direction is accomplished. In the case that a player stamps onto the foot panel 50, the resulting stamping load is transmitted to the sensitive element 31 through the ribs 32*a* and 32*b*, causing the electrode plates 33*a* and 33*b* to make contact with each other. In consequence, detecting whether or not conduction occurs between the leads 36*a* and 36*b* makes it possible to determine if a stamping action on the foot panel 50 has been made or not. Additionally, the lengths of the ribs 32*a* and 32*b* is set such that they are shorter than the electrode plates 33*a* and 33*b*. This permits the load transmitted through the ribs 32*a* and 32*b* to concentrate on a longitudinal central part of the electrode plate 33*a*, leading to a steady detection of the load by the sensitive element 31 even when a small amount of load is applied to the foot panel 50.

When applying a load exceeding a predetermined limit to the foot panel 50, the stopper 40 and the panel 50 come into contact with each other, preventing from a further displacement of the panel 50. Thus an overlord toward the tape switch 30 is avoided, with the result that its longevity and reliability are improved. Because the stopper 40 is located adjacently to the tape switch 30 at an inner-side position thereto, the foot panel 50 is bent downward as shown by double-dotted chain lines in FIG. 2. This confines the tape switch 30 to a small amount of indentation when it makes contact with the stopper 40. An overload onto the tape switch 30 can therefore be avoided in a steady manner.

Incidentally, in the case that the stopper 40 is attached on the outer side of the tape switch 30 or on the corner plate 29, a displacing amount of the foot panel 50 during the period from the non-load state to the contact made between the stopper 40 and the foot panel 50 becomes larger at the position of the tape switch 30 than at that of the stopper 40. This leads to a fear that the load applied to the tape switch 30 is not restricted to a small quantity. In addition, when the stopper 40 is located at an outer side to the tape switch 30, a distance from the stopper 40 to the center of the foot panel 50 is more increased, compared to the occasion where the stopper 40 is located at an inner side to the tape switch 30. This causes a fear that a maximum deflection amount in the central area of the foot panel 50 (a sinking amount caused by stamping) increases and a feeling of stamping is deteriorated. In contrast, when the stopper 40 is located at an inner side to the tape switch 30, the maximum deflection amount at the central area of the foot panel 50 is decreased, swelling a feeling of rigidity that a player feels when stamping onto the foot panel 50. This provides players with a feeling of stamping comparable to dancing on the floor of general architectures.

Figure 4B:
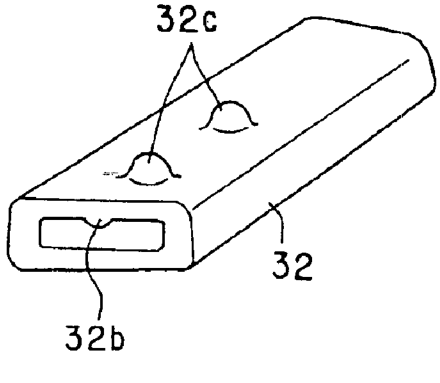
Figure 4C:
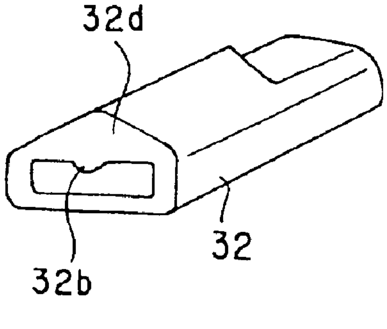

As the tape switch 30 mentioned so far, a STARTAPE (registered trademark in Japan) available from MITSUBOSHI BELTING LTD., can be used, for instance. If the ribs 32*a* and 32*b* commercially available are used and are longer than a predetermined length, an additional work may be performed such that both the ends of the rib 32*a* are cut down to shorten the length, as shown by two-dotted chain lines L in FIGS. 3 and 4A. In such a case, either one of the rib 32*a* or 32*b* may be omitted. The ribs 32*a* and 32*b* are not restricted to ones having an arch-like section, but ribs of a triangular or trapezoidal section may be used. Instead of the ribs 32*a* and 32*b*, a plurality of separated island-like protrusions 32*c* can be arranged at intervals in the longitudinal direction of the switch 30, as shown in FIG. 4B, for instance. Alternatively, as shown in FIG. 4C, the coating member 32 is able to have an protrusion 32*d* by forming the upper or inner surface into an angle-like shape that increases in an amount of protrusion as going from both the lateral ends to the lateral center. Although the stopper 40 and the tape switch 30 are depicted in the drawings as being approximately identical in length to each other, the length of the stopper 40 may be shorter or longer than that of the tape switch 30.

As clear from FIG. 1, a control substrate 41 is disposed in the inner space of the inner frame 27. The control substrate 41 is placed on four female screw studs 44, . . . , 44 (only two of them are shown in FIG. 1) secured on the upper surface of the bottom plate 21*a* of the base 21, so that the control substrate 41 is sustained at a separated position over the bottom plate 21*a* Screws 45 are applied to the female screw studs 44 on the upper surface of the control substrate 41, securing the control substrate 41 on the studs 44. On the upper surface of the control substrate 41, a single pair of cold cathode tubes 43 and 43 is placed as means for lighting the foot switch 24 from the inside thereof. Provided on the control substrate 41 are a switch circuit being connected with the leads 36*a* and 36*b* of the tape switch 30 and transmitting to a controller of the game system 10 a signal corresponding to conduction states between the leads and a lighting control circuit controlling the lighting of the cold cathode tubes 43. A reflective layer is also coated on the upper surface of the control substrate 41 so that it reflects light illuminated by the cold cathode tubes 43. The reflective layer is formed, for example, by coloring in white the entire upper surface of the substrate 41 through silk printing. Drainage holes 42, . . . , 42 are formed through the bottom plate 21*a*.

The four corners of each foot panel 50 are cut out to avoid interference with the corner plates 29, in other words, to retreat toward the central side of the panel-attaching section 26 from the corner plates 29. After the foot panel 50 is attached to the panel-attaching section 26, anti-dislocating covers 51, . . . , 51 are set on the four cut-out corners. Applying screws 52 and 52 to each corner plate 29 through each cover 51 permits both the plate and the cover to couple with each other, preventing the foot panel 50 from dislocating upward. The upper surface of the foot panel 50 which has an anti-dislocating mechanism using the covers 51 become low in height to some extent than that of the outer frame 25.

Figure 7:
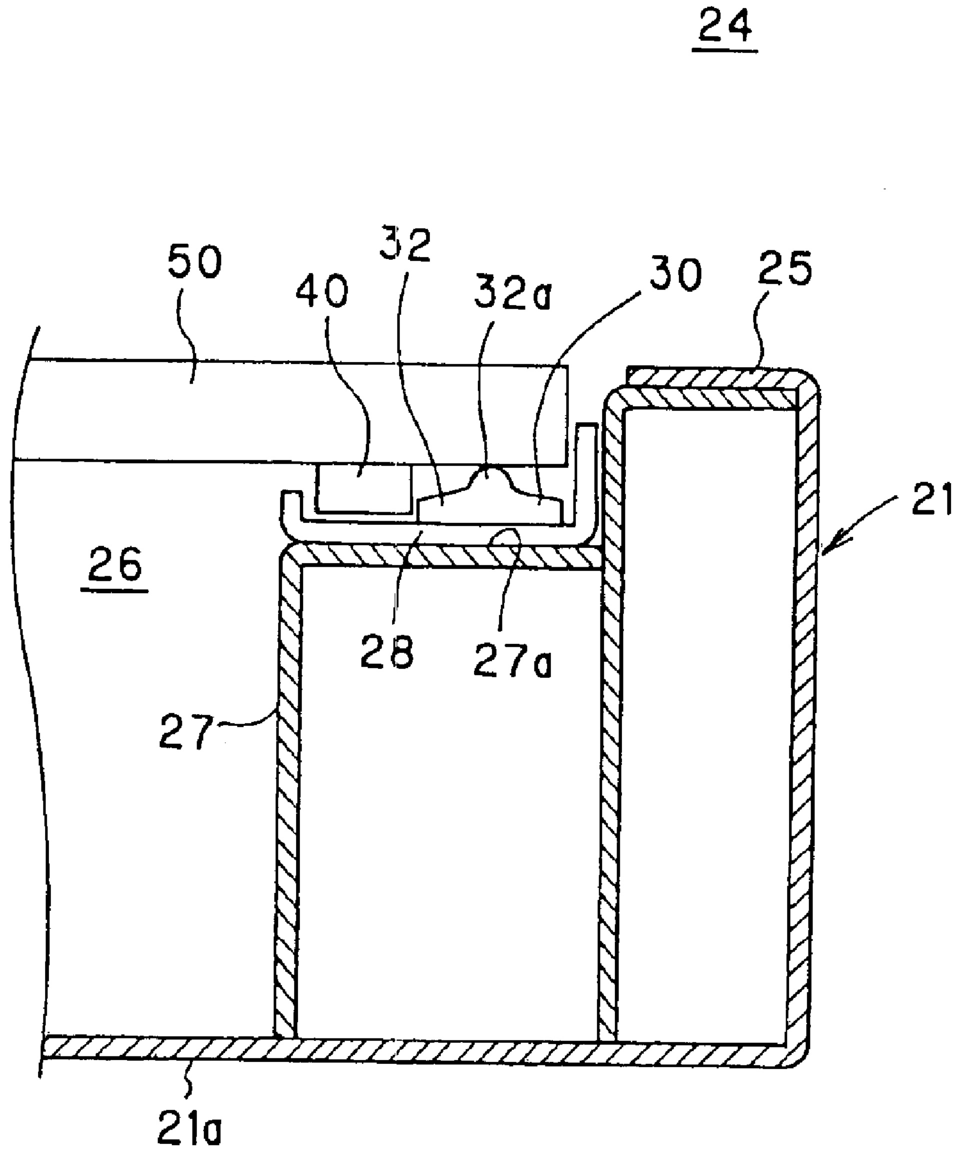
FIG. 7 exemplifies a modification of the tape switch shown in FIG. 3.
Figure 8:
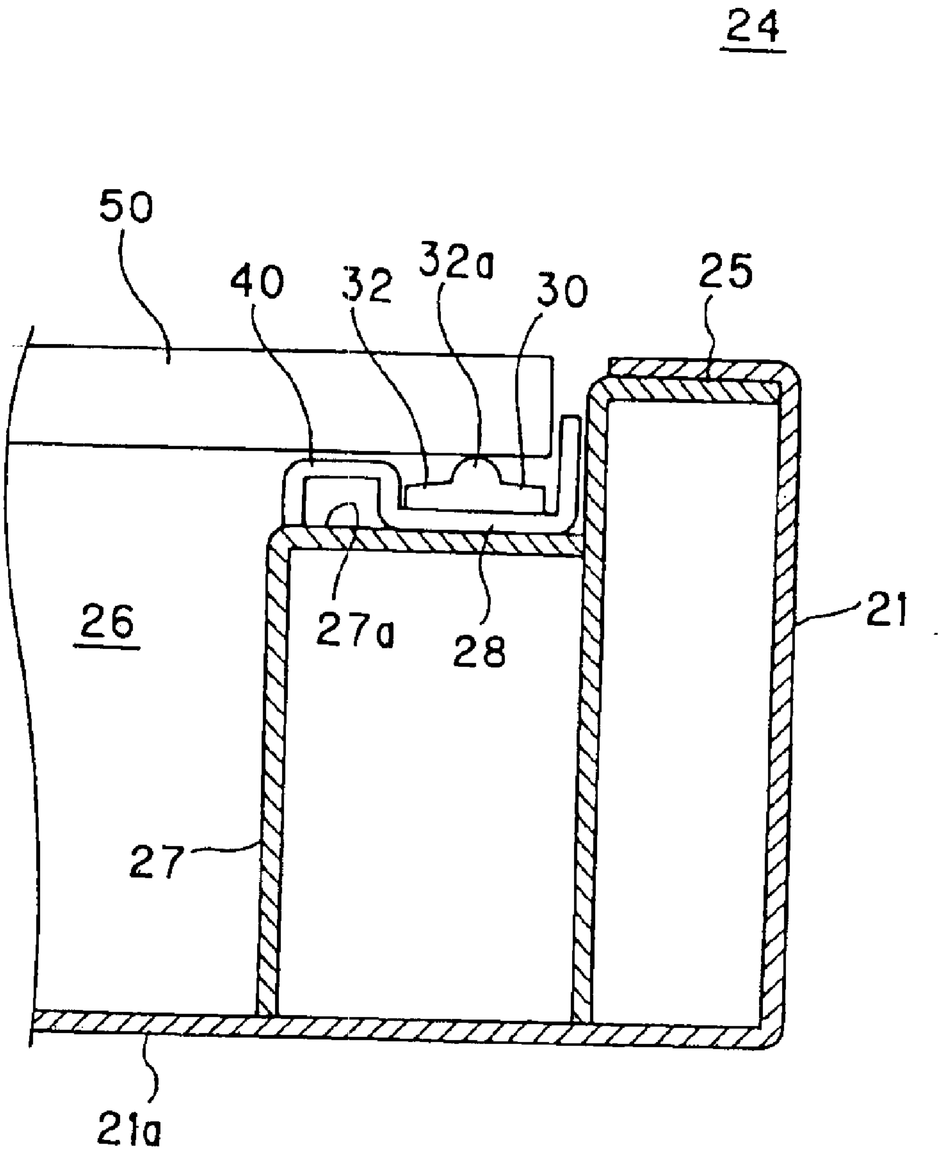
FIG. 8 exemplifies another modification of the tape switch shown in FIG. 3.

Alternatively, as depicted in FIG. 7, the stopper 40 may be attached on the foot panel 50. Furthermore, as depicted in FIG. 8, the sustaining plate 28 may be bent to form an integral unit with the stopper 40. Alternatively, the inner frame 27 can be formed as a single member with the stopper 40.

Figure 9A:
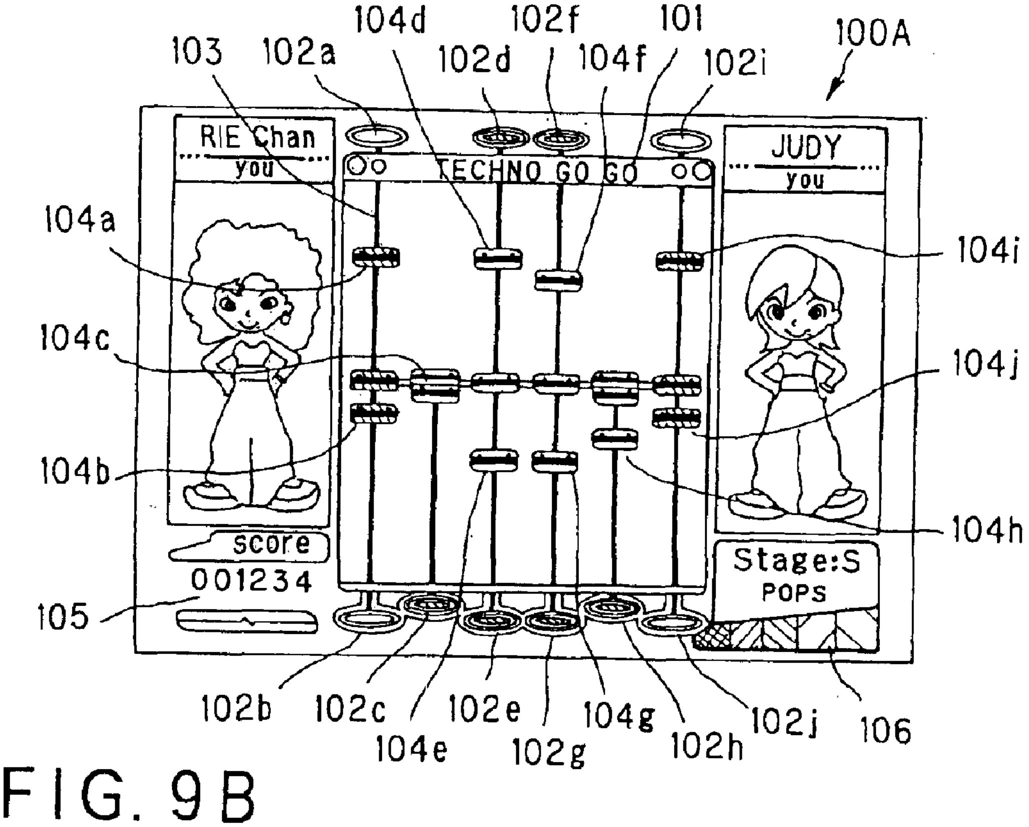
FIGS. 9A and 9B are views representing examples of game images visualized on a monitor of the game system of FIG. 5.

FIG. 9A exemplifies a game image displayed on the monitor 14 of the game system 10. In the central area of a game image 10A, displayed is a guide gauge 101 for guiding a player in procedures of dancing, more practically, procedures of stamping on the foot switches 24*a* to 24*j* in accordance with the dancing music. The upper and lower regions outside the area of the guide gauge 101 include elliptical symbols 102*a* to 102*j* each made to correspond to the foot switches 24*a* to 24*j*. In the inside of the guide gauge 101, each line 103 ( . . . , 103) is displayed correspondingly to each symbol 102*a* ( . . . , 102*j*). The symbols 102*a* to 102*j* are differentiated in color to facilitate mutual distinctions, and each foot panel 50 of the foot switches 24*a* to 24*j* is colored in the same hue as a corresponding one of the symbols 102*a* to 102*j*.

In response to the start of the game, dancing music selected by a player is reproduced by the speaker units 16, and concurrently timing marks 104*a* to 104*j* appear in a central region in the vertical direction of the guide guage 101 with each line 103 matched in position, according to predetermined procedures in synchronous with the music. The timing marks 104*a* to 104*j* are colored in the same hue as corresponding symbols 102*a* to 102*j*. The timing marks 104*a* to 104*j* are scrolled toward the upper or lower ends of the guide gauge 101 along the lines 103 as the music proceeds. If the player stamps on any of the foot switches 24*a* to 24*j* corresponding to the marks 104*a* to 104*j* at the time when any of the marks 104*a* to 104*j* reaches the upper or lower end of the guide guage 101, the stamping action is detected by the foregoing tape switch 30 so that a predetermined detection signal is supplied to the controller of the game system 10. In the controller, both the time when the tape switch 30 detected the stamping action and the time when any of the marks 104*a* to 104*j* reached the upper and lower end of the guide gauge 101 are compared with each other, the player's dancing steps are evaluated in terms of time lag. The smaller the time lag, the higher the appreciation for the player's stamping action.

Depending on the evaluated result of the stamping actions, gauge amounts indicated by a level gauge 106 change and scores displayed on a score it) board 105 change. Given conditions for a piece of music (for example, the gauges in the level gauge 106 indicate amounts more than predetermined levels) are met, the music is cleared to go on to playing the next piece of music. If the conditions are not fulfilled, the game is over.

Figure 9B:
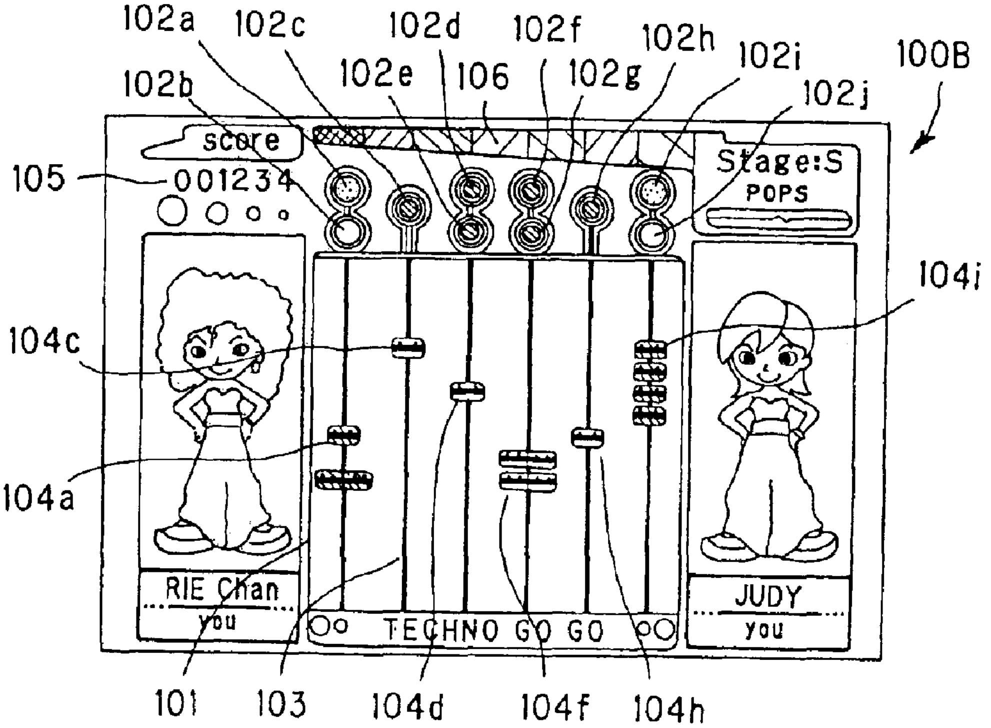
Figure 10:
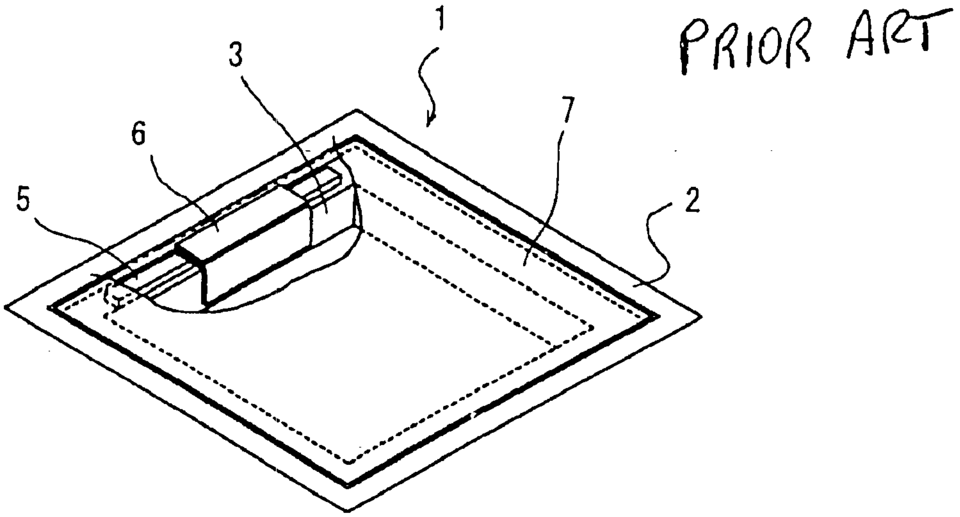
FIG. 10 is a perspective view, partially in section, showing the configuration of a conventional foot switch.
Figure 11:
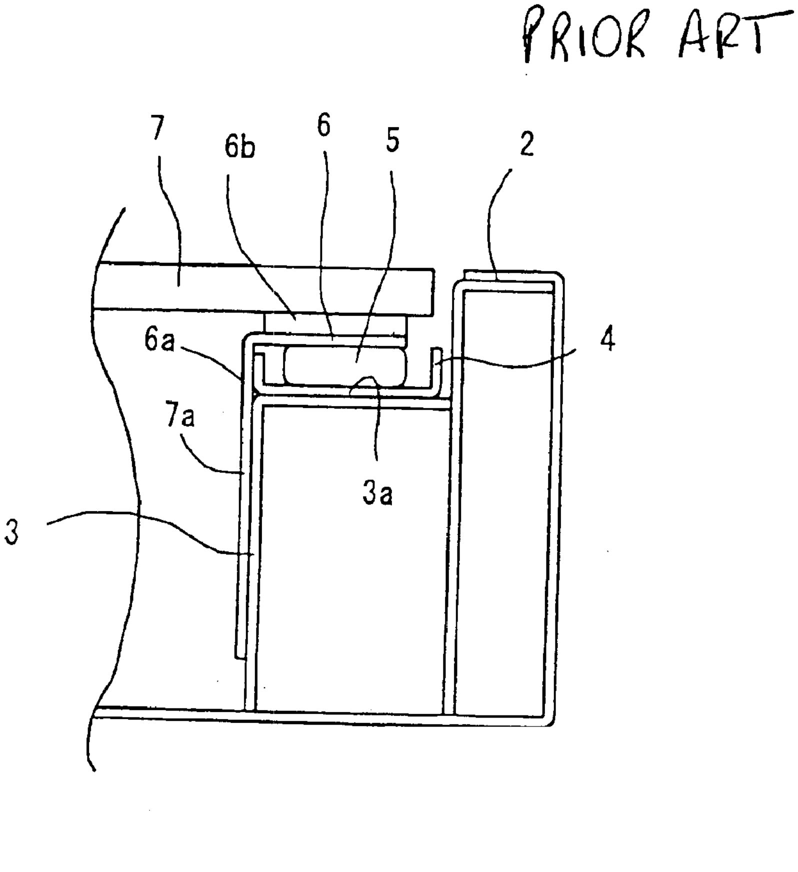
FIG. 11 is a longitudinal sectional view of the foot switch shown in FIG. 10.

FIG. 9B shows another example of a game image. In this image 100B, the symbols 102*a* to 102*j* are located in the upper end portion of the guide gauge 101, in which each pair of the symbols 102*a* and 102*b*, 102*d* and 102*e*, 102*f* and 102*g*, and 102*i* and 102*j* are made to correspond to the same line 103, respectively. Additionally, in the inside of the gauge 101, the timing marks 104*a*, 104*c*, 104*d*, 104*f*, 104*h* and 104*i* are scrolled from the lower end to the upper end in accordance with the progress in the music. At the time when the timing marks 104*a*, 104*c*, 104*d*, 104*f*, 104*h* and 104*i* reach the upper end of the gauge 101, timing for stamping the foot switches 24*a* to 24*j* that correspond to the marks is also realized. As to the timing marks 104*a*, 104*d*, 104*f* and 104*i*, there are two cases; only one mark is displayed at the same position in the line 103, while two marks are displayed in parallel at the same position in the line. 103. Depending on the cases, it is required that a player takes a different action. For instance, when the mark 104*a* displayed alone in the left line 103 reaches the upper end of the gauge 101, it is required that a player stamps selectively onto the foot switches 24*a* and 24*b* that made to correspond to the symbols 102*a* and 102*b*. On the other hand, in the case that two marks 104*a* and 104*a* are displayed in parallel in the left line 103 and those marks 104*a* arrive at the upper end of the gauge 101, it is required that a player stamps, at a time, onto the foot switches 24*a* and 24*b* made to correspond to the symbols 102*a* and 102*b*.

In the foregoing game system 10, the four tape switches 30 are disposed in each foot switch 24. Depending on a position where the foot panel 50 is stamped, there are some cases that the stamping action is detected by only part of the tape switches 30 in the foot panel 50, but not detected by the remaining part thereof. The controller of the game system may employ a manner that the four tape switches 30 for each foot switch 24 are not distinguished from each other. For example, when one or more tape switches 30 for each foot switch 24 detect a stamping action, processing may be done as if the entire foot switch 24 was stamped. Alternatively, when the on and off states of the four tape switches 30 of each foot switch 24 are individually monitored, processing may be performed differently according to which tape switch 30 detects a stamping action. By way of example, a stamping action is evaluated differently between one case that all the tape switches 30 detect the action and the other case that only part of the tape switches 30 detects the action.

The present invention is not limited to the configurations explained by the foregoing embodiments, but may be modified into various other modes. The input apparatus according to the present invention is not confined to the mode used as a foot switch, but can be used as other forms. For example, the input apparatus can be used in a form that it detects player's indentation performed by the fingers or fist. In addition, the directions of the indentation are not always limited to the up and down directions, but may be set to the horizontal or any other directions. Although only the presence or absence of actions of indentation was detected utilizing the tape switch in the foregoing embodiments, the largeness of loads caused by actions of indentation can be obtained using a detection unit capable of supplying a signal corresponding to the magnitudes of the loads. The operation member is not restricted to an approximately square flat-panel member, but it may be formed into various shapes including a disk-like or ellipsoidal shape. As concerning the operation member, it is enough that only part of the operation member which comes in contact with the detection unit is shaped into a flat panel configuration. In the above embodiment, the tape switch serving as a detection unit was arranged on each side of the square panel, but the relationship between the arrangement of the detection unit and the operation member may be altered appropriately; for example, the tape switch is arranged on only a single pair of opposed sides of the panel.

As described above, because the coating member disposed so as to cover the sensing elements of the detection unit is made to contact the operation member to support the operation member, it is not required that another member for transmitting loads be placed between the detection unit and the operation member. This leads to a simplified configuration of the input apparatus, and lessened labor work necessary for the manufacture and maintenance, an increase in reliability of the input apparatus, and reduced manufacturing costs. Particularly, in cases protrusions are attached to the inner and outer surfaces of the coating member, loads applied to the operation member are intensively transmitted to a desired position on each sensing element, thus raising sensitivity in detection. Additionally, arranging the stopper to limit displacements of the detection unit prevents the detection unit from receiving an overload, thereby increasing further the reliability of the input apparatus. Especially, when the stopper is arranged at an inner side to the detection unit, the deflection of the operation unit at a contacted position with the detection unit can be suppressed to a small amount of deflection, thus steadily preventing the overload. Concurrently, an amount of deflection arising at the center of the operation member is suppressed to a small value, so that a feeling of rigidity given a player who handles the operation member is enhanced. Therefore, a feeling of rigidity experienced when operating the operation member becomes appropriate for a necessary input apparatus. For instance, when using the operation member practiced in the form of a foot panel, a player is able to have an operation feeling comparable to stamping the floor in general architectures.

What is claimed is:

1. An input apparatus for game systems comprising:

an operation member adapted to receive a load; and a plurality of detection units arranged such that said operation member is supported by said detection units at a plurality of points around an outer circumference of said operation member with a space being formed under a center of said operation member, each of said detection units being capable of outputting a predetermined detection signal in response to changes in load in a predetermined direction in relation to said operation member, each of said detection units including a sensing element and a coating member made of elastic material, said coating member coating said sensing element and functioning as a medium to unit the load applied to said operation member to said sensing element, said sensing element including one pair of elongate electrode plates arranged to contact or separate from each other according to the load, said coating member including a protrusion for limiting a position to which the load toward said sensing element is transmitted, said protrusion being shifted from both longitudinal ends of said electrode plates into a central side of said electrode plates and supporting said operation member.

2. The input apparatus of claim 1, wherein said protrusion is arranged on an outer surface of said coating member.

3. The input apparatus of claim 1, wherein said protrusion is arranged on an inner surface of said coating member.

4. The input apparatus of claim 1, further comprising a stopper for limiting displacement of said operation member in relation to the predetermined direction in a certain range.

5. The input apparatus of claim 4, wherein said operation member is formed into a panel, and said stopper is located closer to a center of said operation member than said detection unit.

6. The input apparatus of claim 5, wherein said stopper adjoins said detection unit.

7. The input apparatus of claim 1, wherein said operation member is a foot panel on which a player is able to stamp.

8. The input apparatus of claim 1, wherein said electrode plates comprise a pair of opposed metallic plates and said sensing element further comprises insulating means for separating said metallic plates from one another, said coating member being arranged to overlie an upper one of said metallic plates and lie below a lower one of said metallic plates.

9. The input apparatus of claim 1, wherein said coating element defines an interior cavity, said sensing element being arranged in said cavity.

10. The input apparatus of claim 1, wherein said detection units are elongate.

11. An input apparatus for game systems comprising:

a base having a plurality of panel-attaching sections;

an operation member arranged at each of said panel-attaching sections and adapted to receive a load;

a plurality of detection units arranged at each of said panel-attaching sections such that said operation member is supported by said detection units at a plurality of points around an outer circumference of said operation member with a space being formed under a center of said operation member;

a plurality of stoppers for limiting an amount of pushing operation toward said operation member, said stoppers being arranged entirely inward compared to said plurality of detection units in relation to said operation member, each of said detection units being located between a panel-supporting surface formed on each of said panel-attaching sections and said operation member and being capable of outputting a predetermined detection signal in response to changes in pushing load applied to said operation member, each of said detection units including a sensing element and a coating member mode of elastic material, said coating member coating said sensing element and functioning as a medium to transmit the load applied to said operation member to said sensing element, said coating member being arranged to contact said operation member and support said onion member.

12. The input apparatus of claim 11, wherein said operation member is a foot panel on which a player is able to stamp.

13. The input apparatus of claim 11, wherein said stoppers are arranged external of said detection units.

14. A foot switch for an input apparatus for game systems comprising:

a frame defining a support surface;

at least one detection unit arranged on said support surface of said frame and to output a detection signal in response to changes in a load applied in a predetermined direction, each of said at least one detection unit comprising a sensing element and a coating member made of elastic and surrounding said sensing element, said sensing element including a pair of elongate electrode plates arranged to contact or separate from each other according to the load, and said coating member including a protrusion for limiting a position to which the load toward said sensing element is transmitted, said protrusion being spaced from both longitudinal ends of said electrode plates; and an operation member adapted to receive a load and arranged in contact with said coating member of said at least one detection unit such that said coating member supports said operation member on said fame and transmits the load received by said operation member to said sensing element.

15. The foot switch of claim 14, wherein said electrode plates comprise a pair of opposed metallic plates and said sensing element further comprises insulating means for separating said metallic plates from one another, said coating member being arranged to overlie an upper one of said metallic plates and lie below a lower one of said metallic plates.

16. The foot switch of claim 14, wherein said coating element defines an interior cavity, said sensing element being arranged in said cavity.

17. The foot switch of claim 14, wherein said protrusion is arranged on at least one of an outer surface and an inner surface of said coating member.

18. The foot switch of claim 14, wherein said coating member is elongate and said protrusion extends longitudinally along said coating member, said protrusion being spaced from longitudinal ends of said coating member.

19. The foot switch of claim 14, further comprising at least one stopper for limiting displacement of said operation member.

20. The foot switch of claim 19, further comprising at least one sustaining plate arranged on said frame, said at least one detection unit and said at leas one stopper being arranged on a respective one of said at least one sustaining plate.

21. The foot switch of claim 19, wherein said at least one stopper is arranged on an underside of said operation member.

22. The foot switch of claim 19, wherein each of said at least one stopper is arranged proximate a respective one of said at least one detection unit.

23. The foot switch of claim 14, wherein said coating member includes a plurality of separate protrusions.

24. The foot switch of claim 14, further comprising at least one sustaining plate arranged on said frame and including a raised, stopper portion for limiting displacement of said operation member, said at least one detection unit being arranged on a respective one of said at least one sustaining plate.

25. An input apparatus for game systems comprising:

an operation member adapted to receive a load and having an outer surface portion formed into a panel; and a detection unit capable of outputting predetermined detection signal in response to changes in load in a predetermined direction in relation to said operation member, and a stopper for limiting displacement of said operation member in relation to the predetermined direction in a certain range, said detection unit including a sensing element and a coating member made of elastic material, said coating member coating said sensing element and functioning as a medium to transmit the load applied to said operation member to said sensing element, said coating member being arranged to contact an outer circumference of said operation member and support said operation member in the predetermined direction, and said stopper being located closer to a center of said operation member than said detection unit.

26. The input apparatus of claim 25, wherein said stopper adjoins said detection unit.

27. The input apparatus of claim 25, wherein said operation member is a foot panel on which a player is able to stamp.

28. The input apparatus of claim 25, wherein said stopper is arranged external of said detection unit such that said operation member is in contact with said stopper upon application of the load in the predetermined direction.

* * * * *